US010355376B2

(12) United States Patent
de la Garza Fernandez et al.

(10) Patent No.: US 10,355,376 B2
(45) **Date of Patent: *Jul. 16, 2019**

(54) CRIMP CONNECTION FOR MESH SHIELDING MATERIAL USED IN STEERING WHEEL WITH CAPACITIVE SENSING

(71) Applicant: GENTHERM INC., Northville, MI (US)

(72) Inventors: Gerardo Edel de la Garza Fernandez, Ciudad Acuna (MX); Carlos Alberto Gonzalez Reyes, Cd. Acuna (MX)

(73) Assignee: GENTHERM, INC., Northville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/039,735

(22) Filed: Jul. 19, 2018

(65) Prior Publication Data

US 2018/0323517 A1 Nov. 8, 2018

Related U.S. Application Data

(63) Continuation of application No. 15/296,495, filed on Oct. 18, 2016, now Pat. No. 10,056,702.

(Continued)

(51) Int. Cl.

*H01R 4/00* (2006.01)
*H01R 4/20* (2006.01)

(Continued)

(52) U.S. Cl.

CPC ................. *H01R 4/20* (2013.01); *H01R 4/12* (2013.01); *H01R 4/182* (2013.01); *H01R 4/184* (2013.01);

(Continued)

(58) Field of Classification Search

CPC .... H02G 15/20; G01R 27/2695; B60N 2/992; B62D 1/04; H01R 4/66; H01B 13/20; H01B 11/06

(Continued)

(56) References Cited

U.S. PATENT DOCUMENTS 2,911,459 A 11/1959 Haberland
5,829,991 A * 11/1998 Murphy ................ H01R 9/034 439/98

(Continued)

FOREIGN PATENT DOCUMENTS

DE 10393985 B4 4/2009
DE 10 2011 084 903 A1 * 1/2011 ............... G01B 3/08

(Continued)

*Primary Examiner* — William H. Mayo, III

(74) *Attorney, Agent, or Firm* — Carlson, Gaskey & Olds, P.C.

(57) ABSTRACT

An example assembly includes an electrically conductive member, an electrically conductive mesh, and a crimp connector. The electrically conductive mesh includes a first area and a second area. The second area extends along a second longitudinal axis and is larger than the first area. The first area is twisted and extends from the second area along a first longitudinal axis that is transverse to the second longitudinal axis. One of the electrically conductive member and the twisted first area is twisted around the other of the electrically conductive member and the twisted first area to form a twisted connection. The crimp connector is crimped onto the twisted connection to form a crimped connection. The first area of the electrically conductive mesh, including the crimped connection, is folded onto the second area of the electrically conductive mesh.

21 Claims, 6 Drawing Sheets

Related U.S. Application Data

(60) Provisional application No. 62/250,659, filed on Nov. 4, 2015.

(51) Int. Cl.

| | |
|---|---|
| ***H01R 4/18*** | (2006.01) |
| ***H01R 4/12*** | (2006.01) |
| ***H01R 43/048*** | (2006.01) |
| *H01R 4/70* | (2006.01) |

(52) U.S. Cl.
CPC ............. *H01R 43/048* (2013.01); *H01R 4/70* (2013.01); *H01R 2201/26* (2013.01)

(58) Field of Classification Search
USPC ........ 174/74 R, 78, 126.1; 29/825, 864, 828, 29/862, 517, 871, 516, 518; 324/686; 340/457.1, 438; 219/204; 439/98, 99, 439/100, 607, 609, 610
See application file for complete search history.

(56) References Cited

U.S. PATENT DOCUMENTS

| | | | | |
|---|---|---|---|---|
| 5,900,587 | A * | 5/1999 | Piper | H01R 12/62 174/117 F |
| 6,085,416 | A * | 7/2000 | Ikeda | B60R 16/0215 174/36 |
| 6,220,627 | B1 | 4/2001 | Stanley | |
| 6,378,900 | B1 | 4/2002 | Stanley et al. | |
| 6,437,245 | B1 * | 8/2002 | Hayashi | H01R 13/6215 174/74 R |
| 6,517,106 | B1 | 2/2003 | Stanley et al. | |
| 6,520,535 | B1 | 2/2003 | Stanley et al. | |
| 6,703,845 | B2 | 3/2004 | Stanley et al. | |
| 7,098,674 | B2 | 8/2006 | Stanley et al. | |
| 8,011,234 | B2 | 9/2011 | Kandler | |
| 8,305,092 | B2 | 11/2012 | Tabaczynski | |
| 8,721,362 | B2 * | 5/2014 | Kato | D03D 3/005 439/502 |
| 8,970,231 | B2 | 3/2015 | Kandler | |
| 8,970,232 | B2 | 3/2015 | Kandler | |
| 9,058,911 | B2 * | 6/2015 | Ogura | H01B 7/0045 |
| 9,320,087 | B2 * | 4/2016 | Takahashi | H05B 3/342 |
| 2004/0144197 | A1 * | 7/2004 | O'Grady | B62D 1/065 74/558 |
| 2006/0278631 | A1 * | 12/2006 | Lee | H05B 3/342 219/529 |
| 2009/0314511 | A1 | 12/2009 | Hagi et al. | |
| 2010/0137702 | A1 * | 6/2010 | Park | A61B 5/0402 600/393 |
| 2010/0258334 | A1 * | 10/2010 | Akaike | B60N 2/5685 174/126.1 |
| 2011/0245643 | A1 * | 10/2011 | Lisseman | A61B 5/01 600/372 |
| 2014/0127938 | A1 * | 5/2014 | De France | H01R 9/0512 439/567 |
| 2014/0151356 | A1 | 6/2014 | Magiure et al. | |
| 2014/0197942 | A1 | 7/2014 | Tabaczynski et al. | |
| 2014/0253151 | A1 | 9/2014 | Kandler et al. | |
| 2014/0326708 | A1 | 11/2014 | Barfuss et al. | |
| 2015/0369633 | A1 | 12/2015 | Karasawa et al. | |

FOREIGN PATENT DOCUMENTS

| | | | |
|---|---|---|---|
| DE | 102011084903 | A1 | 4/2013 |
| EP | 2955737 | A1 | 7/2014 |
| JP | H02-273472 | A | 5/1992 |
| JP | H06-50164 | A | 2/1994 |
| JP | 2008108699 | A | 5/2008 |
| JP | 2008010354 | A | 7/2008 |

* cited by examiner

CRIMP CONNECTION FOR MESH SHIELDING MATERIAL USED IN STEERING WHEEL WITH CAPACITIVE SENSING

CROSS-REFERENCE TO RELATED APPLICATION

This application is a continuation of prior application Ser. No. 15/296,495, filed on Oct. 18, 2016, which claims the benefit of U.S. Provisional Application No. 62/250,659, filed Nov. 4, 2015, the disclosures of which are incorporated herein by reference in their entirety.

TECHNICAL FIELD

The present disclosure relates to electrical connections, and more particularly to a crimp connection for connecting a wire to an electrically conductive mesh in a steering wheel, for example.

BACKGROUND

Soldering is a method used to make electrical connections in which a material, solder, is melted to join two items together. Solder may be used to connect wires together, or to connect wires to circuit boards, for example. However, soldered connections can be problematic for a number of reasons. One such reason is that it can be difficult to utilize consistent amounts of solder in connections. Despite efforts to use the same amount of solder in multiple connections, differing amounts may end up being used. This can be problematic in steering wheel assemblies in which electrical connections are situated beneath a steering wheel cover, because while some steering wheels may have a desired amount of solder in their connections, other steering wheels may include prominent lumps of solder that are detectable by driver touch.

SUMMARY

One example embodiment of an assembly includes an electrically conductive member, an electrically conductive mesh, and a crimp connector. The electrically conductive mesh includes a second area that extends along a second longitudinal axis, and a first area that is twisted and extends from the second area along a first longitudinal axis that is transverse to the second longitudinal axis. One of the electrically conductive member and the twisted first area is twisted around the other of the electrically conductive member and the twisted first area to form a twisted connection. The crimp connector is crimped onto the twisted connection. The first area of the electrically conductive mesh, including the crimped connection, is folded onto the second area of the electrically conductive mesh. The second area is larger than the first area.

In another example embodiment of the above described assembly, the first area of the electrically conductive mesh includes a rectangular tab.

In another example embodiment of any of the above described assemblies, the electrically conductive member is a wire, and the wire and the twisted first area are twisted around each other to form the twisted connection.

In another example embodiment of any of the above described assemblies, the electrically conductive mesh includes a plurality of interlocking loops that are electrically conductive.

In another example embodiment of any of the above described assemblies, the electrically conductive mesh includes aluminum, copper, or tungsten.

In another example embodiment of any of the above described assemblies, the assembly includes a steering wheel core and an aesthetic cover that is wrapped around the steering wheel core. The second area of the electrically conductive mesh is wrapped around the steering wheel core, and is at least partially situated between the steering wheel core and the aesthetic cover.

In another example embodiment of any of the above described assemblies, the assembly includes a capacitive sensor situated between the aesthetic cover and the second area of the electrically conductive mesh, and a heating element situated between steering wheel core and the second area of the electrically conductive mesh. The second area of the electrically conductive mesh is configured as an electromagnetic interference (EMI) shield to shield the capacitive sensor from EMI of the heating element.

One example method of electrically connecting an electrically conductive member to an electrically conductive mesh includes twisting a first area of the electrically conductive mesh, which extends along a first longitudinal axis from a second area of the electrically conductive mesh, to form a twisted mesh area. The second area extends along a second longitudinal axis that is transverse to the first longitudinal axis, and the second area is larger than the first area. One of the electrically conductive member and the twisted mesh area is twisted around the other of the electrically conductive member and the twisted mesh area to form a twisted connection. A crimp connector is crimped over the twisted connection to form a crimped connection. The first area of the electrically conductive mesh, including the crimped connection, is folded onto the second area of the electrically conductive mesh.

In another example embodiment of the above described method, the first area of the electrically conductive mesh includes a rectangular tab.

In another example embodiment of any of the above described methods, the electrically conductive member is a wire, and twisting of one of the wire and the twisted mesh area around the other of the wire and the twisted mesh area to form a twisted connection includes twisting the wire and the twisted mesh area around each other.

In another example embodiment of any of the above described methods, the crimp connector has a cylindrical shape prior to the crimping.

In another example embodiment of any of the above described methods, the electrically conductive mesh includes a plurality of interlocking loops that are electrically conductive.

In another example embodiment of any of the above described methods, the electrically conductive mesh includes aluminum, copper, or tungsten.

In another example embodiment of any of the above described methods, the method includes wrapping the electrically conductive mesh around a steering wheel core, and wrapping a capacitive sensor layer around the steering wheel core, such that the electrically conductive mesh is situated between the steering wheel core and the capacitive sensor layer.

In another example embodiment of any of the above described methods, the method includes wrapping a heating element around the steering wheel core, such that the heating element is situated between the steering wheel core and the electrically conductive mesh.

One example embodiment of a steering wheel assembly includes a steering wheel core, an electrically conductive shield layer, a crimp connector, and a sensor layer. The electrically conductive shield layer includes a second area that extends along a second longitudinal axis, and a first area that is twisted and extends from the second area along a first longitudinal axis that is transverse to the second longitudinal axis. One of the electrically conductive member and the twisted first area is twisted around the other of the electrically conductive member and the twisted first area to form a twisted connection. The second area is larger than the first area. The crimp connector is crimped onto the twisted connection to form a crimped connection. The first area of the shield layer, including the crimped connection, is folded onto the second area of the shield layer. Each of the shield layer and sensor layer at least partially surround the steering wheel core. The shield layer is situated between the steering wheel core and the sensor layer. The shield layer includes an electrically conductive mesh that includes a nickel-copper alloy.

In another example embodiment of the above described steering wheel assembly, the electrically conductive mesh is knitted and includes a plurality of interlocking loops that are electrically conductive.

In another example embodiment of any of the above described steering wheel assemblies, the electrically conductive member is a wire, and the wire and the twisted first area are twisted around each other to form the twisted connection.

In another example embodiment of any of the above described steering wheel assemblies, the electrically conductive shield layer includes a plurality of interlocking loops that are electrically conductive.

The embodiments described herein may be taken independently or in any combination. Features described in connection with one embodiment are applicable to all embodiments, unless such features are incompatible. The features described above, and other features, may be best understood from the following drawings and specification.

BRIEF DESCRIPTION OF THE DRAWINGS

The disclosure can be further understood by reference to the following detailed description when considered in connection with the accompanying drawings.

DETAILED DESCRIPTION

According to one aspect of the present disclosure, techniques are disclosed for electrically connecting a conductive member (e.g., a wire) to a conductive mesh using a crimped connection. The crimped connection may be used as part of an electromagnetic interference (EMI) shield for a steering wheel that utilizes capacitive sensing, for example. The crimped connection can omit any soldering if desired. In one or more embodiments, a first area of a conductive mesh, which extends from a second area of the conductive mesh, is twisted to form a twisted mesh area. The twisted mesh area and a conductive member are twisted together to form a twisted connection, and a crimp connector is crimped over the twisted connection to form a crimped connection.

In one or more embodiments, the first area of the conductive mesh, including the crimped connection, is folded onto the second area of the conductive mesh, and a cover is adhered onto the second area of the conductive mesh to enclose the crimped connection between the cover and the second area of the conductive mesh.

Figure 1:
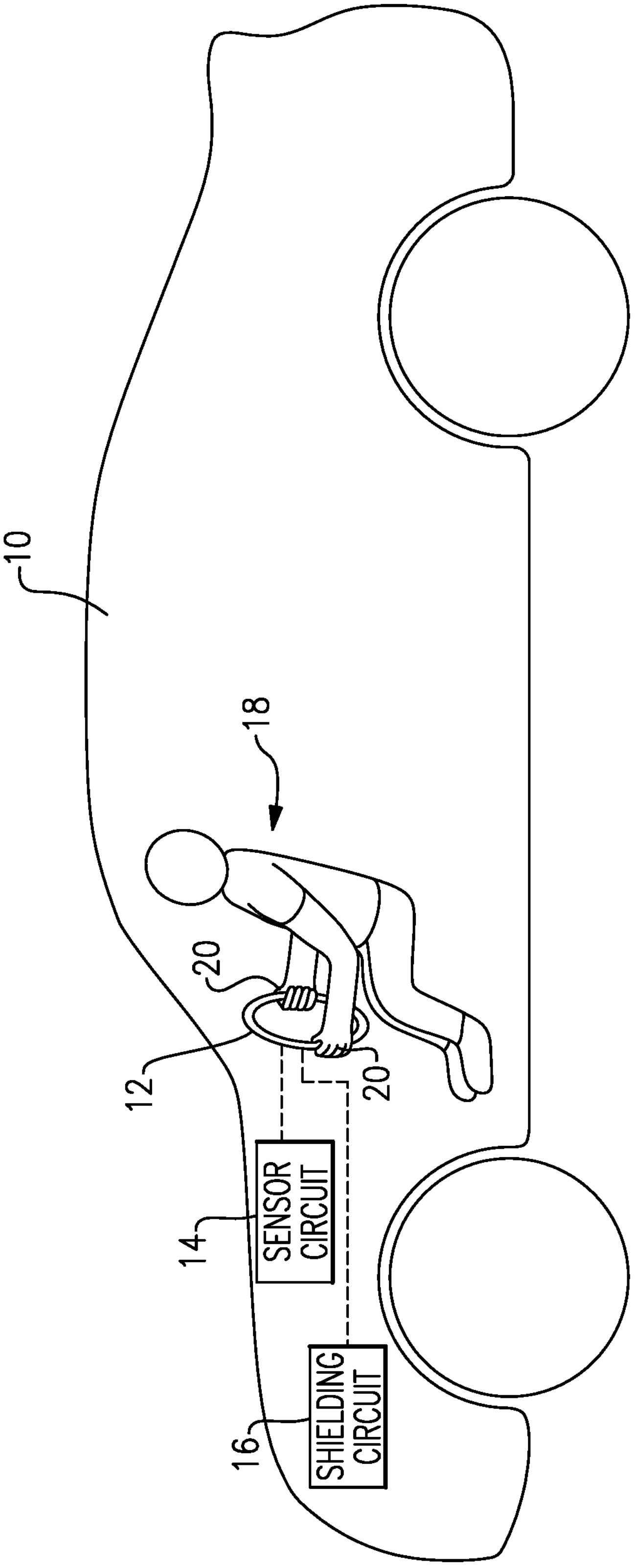
FIG. 1 schematically illustrates a vehicle along having a steering wheel and an associated sensing circuit.

FIG. 1 schematically illustrates a vehicle 10 that includes a steering wheel 12, a sensor circuit 14 (e.g., a capacitive sensing circuit), and a shielding circuit 16 (e.g., for EMI shielding). Although the vehicle 10 shown in FIG. 1 is a car, it is understood that the techniques discussed herein could be applied to other vehicles, and to items other than steering wheels. A driver 18 holds the steering wheel 12 with their hands 20. In one or more embodiments, the sensor circuit 14 is configured to sense when the driver's hands 20 are contacting the steering wheel 12, and the shielding circuit 16 is configured to provide EMI shielding for the sensor circuit 14 via an electrically conductive mesh in the steering wheel 12.

Figure 2:
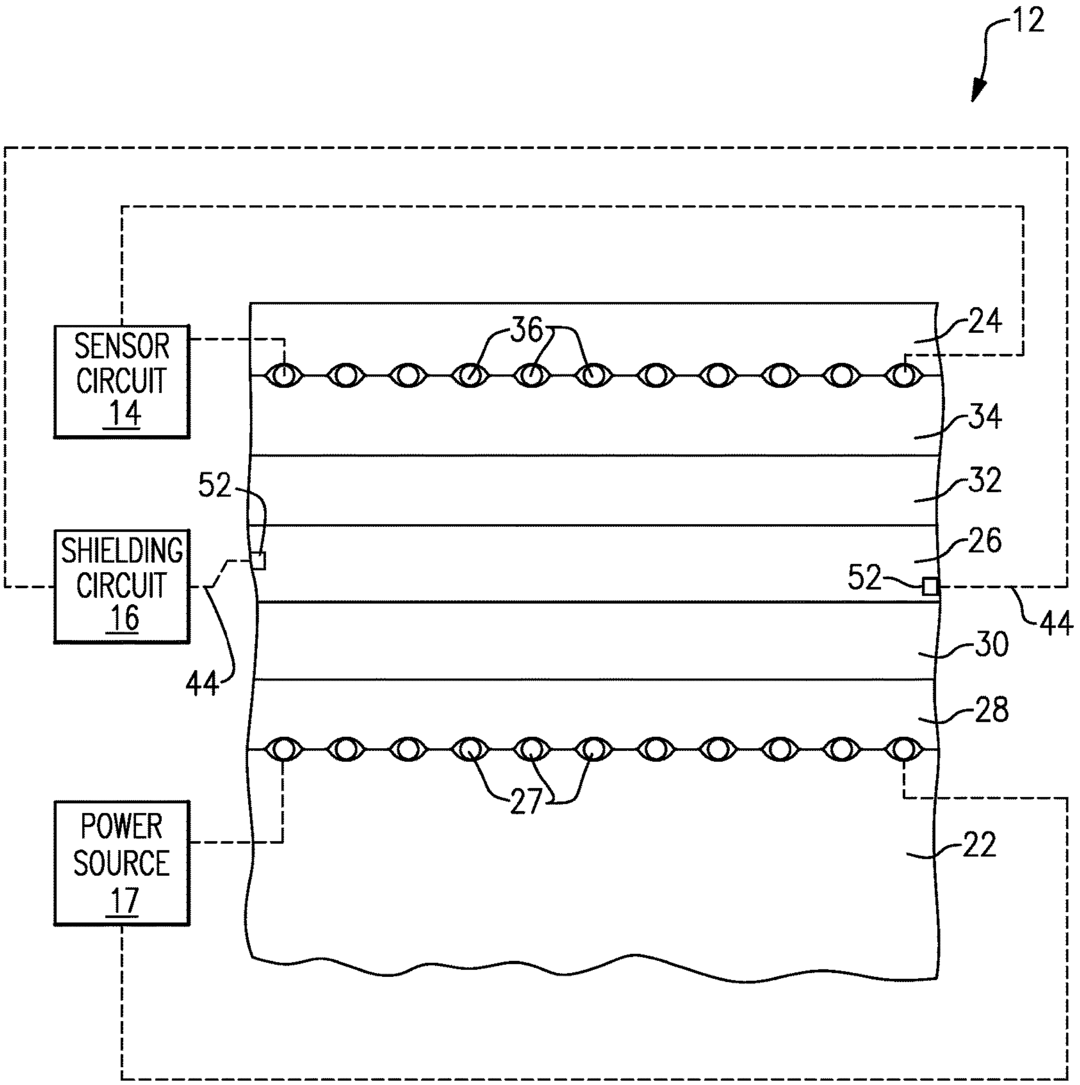
FIG. 2 schematically illustrates an example of sensing and heating features for a steering wheel.

FIG. 2 schematically illustrates an example of sensing and heating features for the steering wheel 12 of FIG. 1. In the example of FIG. 2, the steering wheel 12 includes a plurality of components between a steering wheel core 22 and an aesthetic cover 24. The aesthetic cover 24 may be a leather cover, for example. Heating element wiring 27 is configured as an electric heating element to provide heating for the steering wheel 12. The heating element wiring 27 is connected to a power source 17, such as a vehicle battery.

The heating element wiring 27 is situated between the steering wheel core 22 and an insulating layer 28, which is configured as an electrical insulator. Adhesive layer 30 adheres the insulating layer 28 to an electrically conductive mesh 26. The conductive mesh is connected to shielding circuit 16 via two crimped connections 52. The crimped connections 52 are described in more detail in the discussion of FIGS. 3A-G below. In one or more embodiments, the shielding circuit 16 enables the conductive mesh 26 to operate as an EMI shield to shield sensor wiring 36 from EMI of the heating element wiring 27.

Adhesive layer 32 adheres the conductive mesh 26 to an additional insulating layer 34, which is also configured as an electrical insulator. In one or more embodiments, the insulating layers 28, 34 are foam layers that include a foamed material such as polyurethane foam or synthetic rubber.

Sensor wiring 36 is connected to sensor circuit 14. In embodiments where the sensor circuit 14 is a capacitive sensing circuit, the sensor wiring 36 may be used to detect when a driver's hands are on the steering wheel 12, for example.

Although a plurality of wire sections are shown for each of the heating element wiring 27 and sensor wiring 36, it is understood that either of the heating element wiring 27 and sensor wiring 36 could include one wire, or a plurality of wires. In one or more embodiments, the heating element wiring 27 also includes an electrically conductive mesh.

In one or more embodiments, the conductive mesh 26 includes a plurality of knitted, interlocking loops that are electrically conductive. The conductive mesh 26 may be metallic, and may include aluminum, copper, or tungsten for example. The conductive mesh 26 may include these metals in an alloy (e.g., a nickel copper alloy), for example, or may use other alloys such as stainless steel, galvanized steel, plain steel, or tinned copper. Of course, it is understood that other metals and other alloys could be used.

Figure 3A:
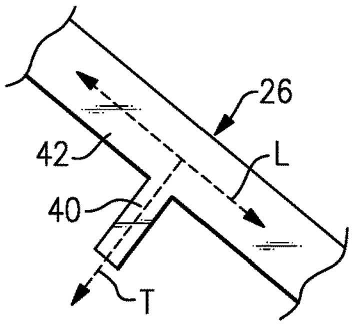
FIGS. 3A-G schematically illustrate a method for electrically connecting a conductive member to a conductive mesh using a crimped connection.

FIGS. 3A-G schematically illustrate a method for electrically connecting an electrically conductive member to electrically conductive mesh 26 using a crimped connection 52. Although the electrically conductive member shown in FIGS. 3A-G is a wire 44, it is understood that other electrically conductive members could be used. Referring first to FIG. 3A, the conductive mesh 26 includes a first area 40 which extends from a second area 42. The second area 42 extends along a longitudinal axis L, and the first area 40 extends along an axis T that is transverse to the axis L, and may be perpendicular to the axis L. In some embodiments, the conductive mesh 26 is flat (e.g., not a braided tube). In the example of FIG. 3A, the second area 42 is larger than the first area 40, and the first area 40 of the conductive mesh 26 has a rectangular shape (e.g., as a rectangular tab of the conductive mesh 26). Also, in the example of FIG. 3A the first area 40 is in the same plane as the rest of second area 42. Although only a small portion of the second area 42 is shown, it is understood that the second area could be sized to cover designated areas of the steering wheel core 22. In one particular example, the second area 42 is an elongated strip having a length approximately equal to the circumference of the steering wheel 12.

Figure 3D:
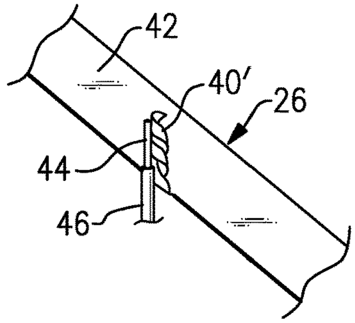
Figure 3B:
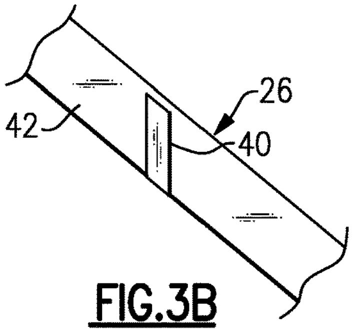
Figure 3E:
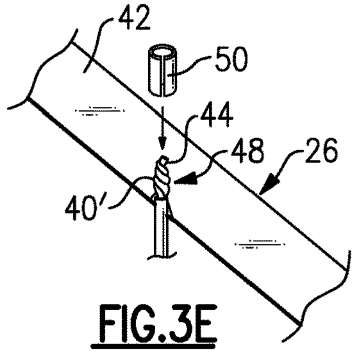
Figure 3C:
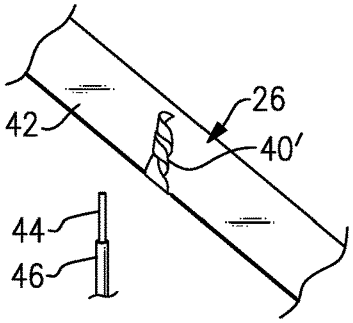

The first area 40 is folded relative to the second area (FIG. 3B). In one example the fold orients the first area 40 at a 90° angle with respect to the second area 42. The first area 40 is twisted to form a twisted mesh area 40' (FIG. 3C). A wire 44, which includes a shielded portion 46, is placed adjacent to the twisted mesh area 40' (FIG. 3D). One of the wire 44 and twisted mesh area 40' is twisted around the other of the wire 44 and the twisted mesh area 40' to form a twisted connection 48 (FIG. 3E). In some embodiments, the wire 44 and twisted mesh area 40' are twisted around each other to form the twisted connection 48. In other embodiments, only one of the wire 44 and twisted mesh area 40' is twisted around the other of the wire 44 and twisted mesh area 40'.

Figure 3F:
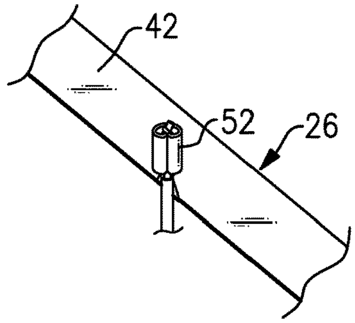
Figure 3G:
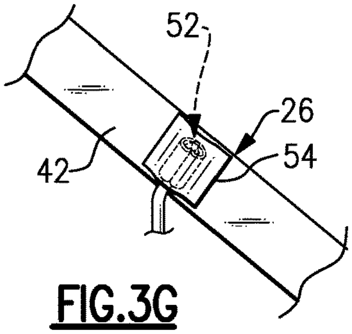

A crimp connector 50 slides onto the twisted connection 48 in the direction shown in FIG. 3E, and is crimped onto the twisted connection 48 to form crimped connection 52 (FIG. 3F). Optionally, the crimped connection 52 is folded back onto the second area 42 of the conductive mesh 26, and a covering 54 is adhered on top of the crimped connection 52 to enclose the crimped connection 52 between the covering 54 and the second area 42 of the conductive mesh 26 (FIG. 3G). The covering 54 can serve as a protective layer for the crimped connection 52. The adhering of the covering 54 may be achieved using an adhesive such as hot glue (e.g., from a glue gun). The covering 54 may face either towards, or away from the steering wheel core 22 in the steering wheel 12, for example.

In one or more embodiments the wire 44 is a 22 American wire gauge (AWG) wire. Of course, other gauges could be used instead. The gauge of wire 44 and the width of the first area 40 (e.g., measured in a direction parallel to axis L) can be selected to achieve a desired crimp size (i.e., a desired cross sectional crimp area within crimp connector 50). In one or more embodiments, a width of the first area 40 (measured in a direction parallel to axis L) is 15 mm, or any value between 10 mm-20 mm. In the same or embodiments, a length of the first area 40 (e.g., measured along axis T) is 20 mm or 30 mm, or any value between 15-35 mm. Of course, it is understood that these are just example width and length values for the first area 40, and that other values could be used.

Figure 4A:
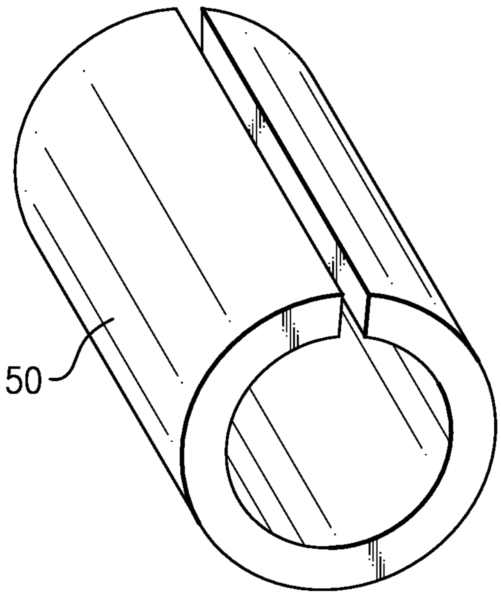
FIG. 4A schematically illustrates a crimp connector before crimping.
Figure 4B:
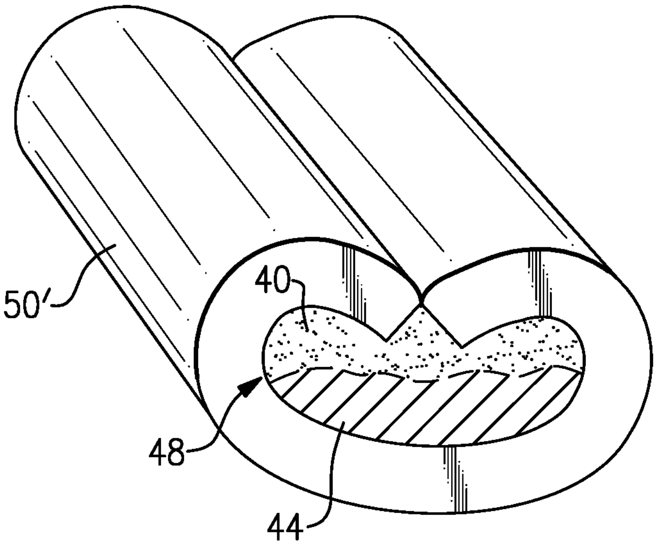
FIG. 4B schematically illustrates the crimp connector of FIG. 4A after crimping.

FIG. 4A schematically illustrates an example crimp connector 50 before crimping, and FIG. 4B schematically illustrates the example crimp connector 50' after crimping. As shown in FIG. 4B, the crimping of the crimp connector 50 deforms the crimp connector 50 to secure the twisted connection 48. FIG. 4B also illustrates an example of how the first area 40 and wire 44 may be situated after the crimping. In the example of FIG. 4A, prior to crimping, the crimp connector 50 has a cylindrical shape. Of course, other crimp connectors could be used instead.

Figure 5:
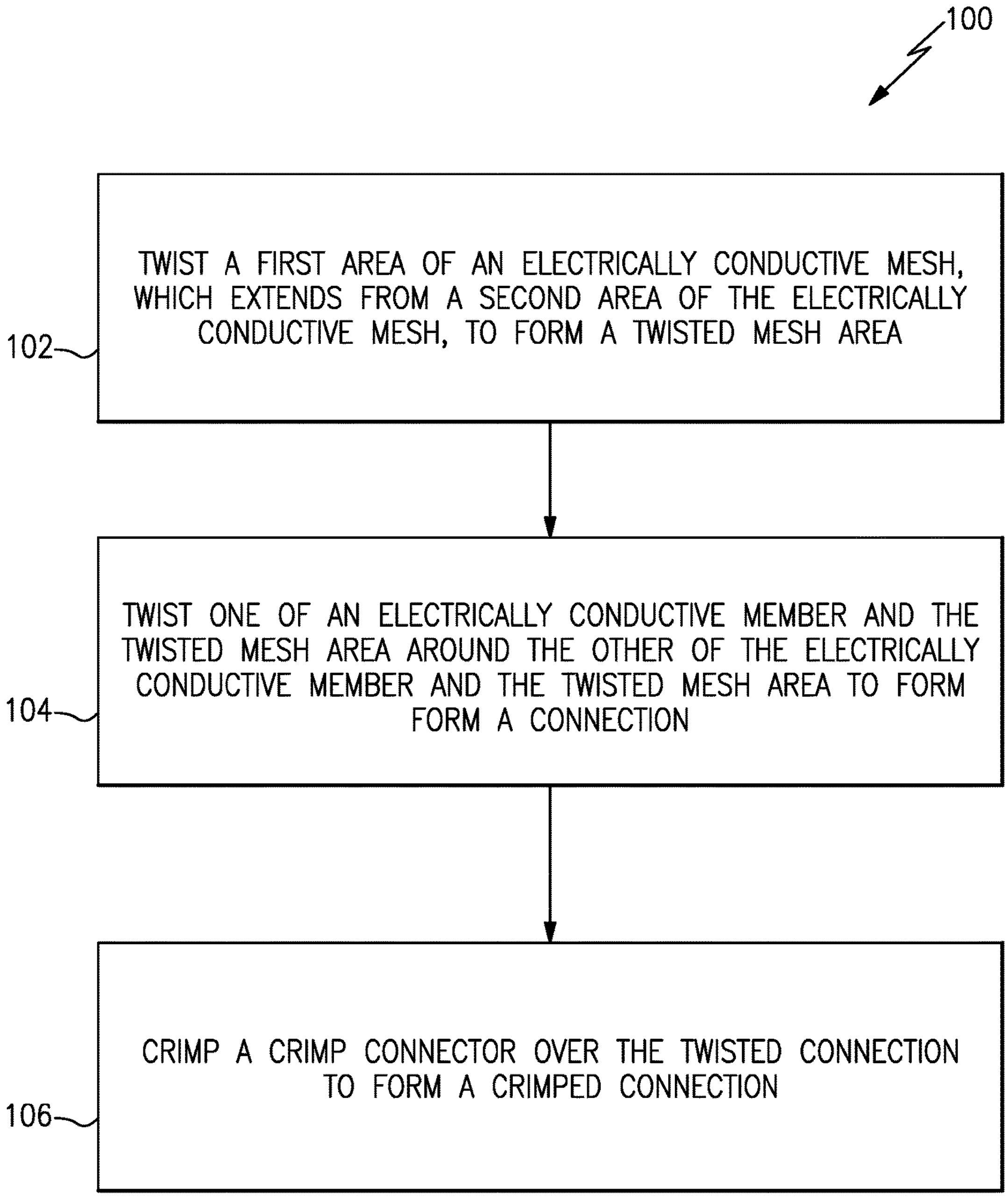
FIG. 5 is a flowchart of a method for electrically connecting a conductive member to a conductive mesh using a crimped connection.

FIG. 5 is a flowchart of a method 100 for electrically connecting an electrically conductive member (e.g., wire 44) to electrically conductive mesh 26 using a crimped connection 52. A first area 40 of the electrically conductive mesh 26, which extends from the second area 42 of the electrically conductive mesh 26, is twisted to form a twisted mesh area 40' (block 102). One of the electrically conductive member and the twisted mesh area 40' are twisted around the other of the electrically conductive member and the twisted mesh area 40' to form a twisted connection 48 (block 104). A crimp connector 50 is crimped over the twisted connection 48 to form a crimped connection 52 (block 106).

In one example, the electrically conductive member is a wire, and the twisting of block 104 includes twisting the wire 44 and the twisted mesh area 40' around each other. In other embodiments, however, only one of the wire 44 and twisted mesh area 40' is twisted around the other of the wire 44 and twisted mesh area 40'.

In some embodiments of the method 100, the first area 40 of the conductive mesh 26, including the crimped connection 52, is folded onto the second area 42 of the conductive mesh 26. In some such embodiments, a covering 54 is adhered onto the crimped first area 40 of the conductive mesh 26 that encloses the crimped connection 52 between the covering 54 and the second area 42 of the conductive mesh 26 and serves as a protective layer for the crimped connection 52 (see FIG. 3G).

As discussed in combination with FIG. 2, the second area 42 of the connective mesh 26 may be part of a steering wheel assembly that includes the steering wheel core 22 and the aesthetic cover 24 that is wrapped around the steering wheel core 22. In some such embodiments, the second area 42 of the conductive mesh 26 is wrapped around the steering wheel core 22, and is at least partially situated between the steering wheel core 22 and the aesthetic cover 24. In some embodiments, the second area 42 of the conductive mesh is shaped to cover designated areas of the steering wheel core 22.

In some embodiments, a capacitive sensor (e.g., sensor wiring 36) is situated between the aesthetic cover 24 and the second area 42 of the conductive mesh 26, and a heating element (e.g., heating element wiring 27) is situated between the steering wheel core 22 and the second area 42 of the conductive mesh 26. In some embodiments, the second area 42 of the conductive mesh 26 is configured as an EMI shield to shield the capacitive sensor from EMI of the heating element. In some embodiments, however, the steering wheel 12 omits the electric heating element, and no heating element wiring 27 is included.

Figure 6:
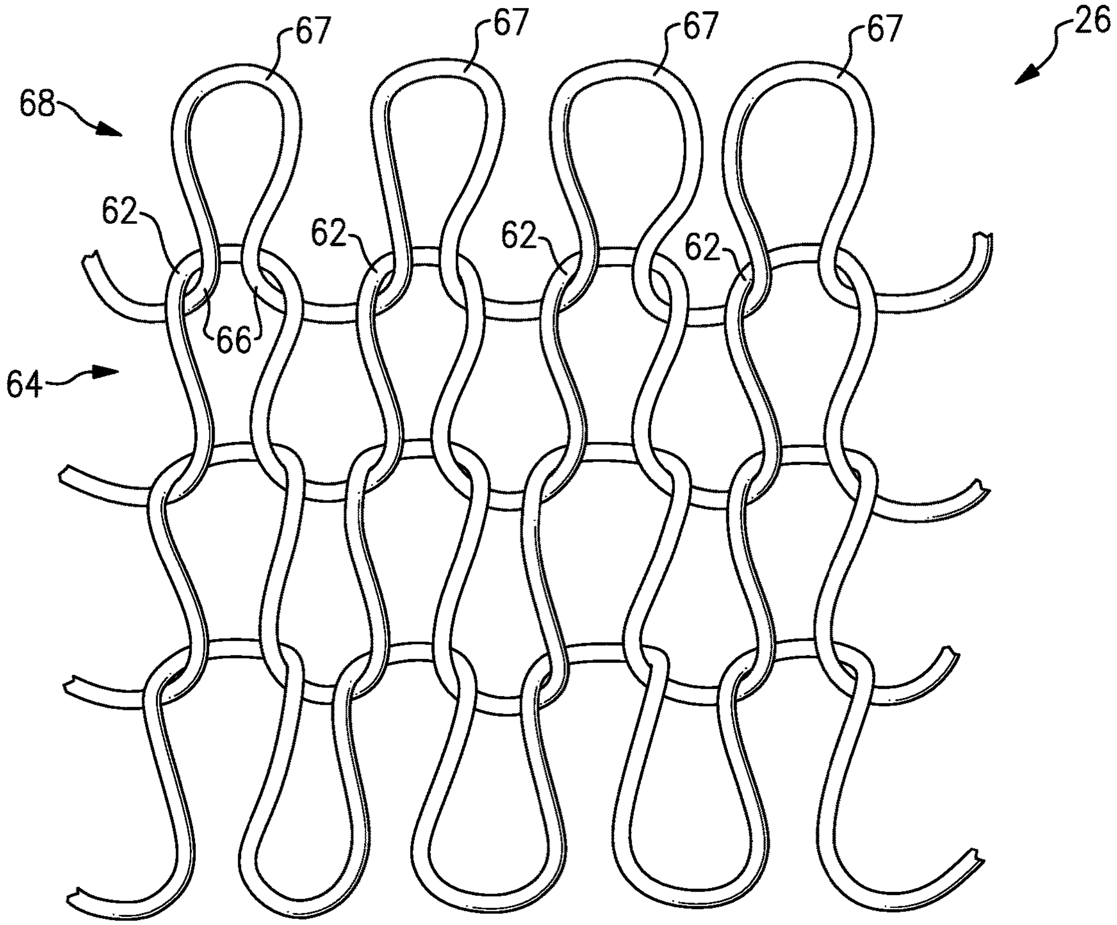
FIG. 6 illustrates an example electrically conductive mesh.

FIG. 6 illustrates an example electrically conductive mesh 26 that is a knitted mesh which includes interlocking loops 62 in one row 64 that wrap about legs 66 of the loops 67 in an adjacent row 68. The loops in the various rows of FIG.

6 can move relative to each other in the same plane without distorting the mesh 26, giving the knitted mesh a two-way stretch. In one or more embodiments, each loop acts as a small spring when subjected to tensile or compressive stress, and if not distorted beyond its yield point will resume its original shape when the stress is removed. In one or more embodiments, the conductive mesh 26 is knit from wires ranging in diameter from 0.0035" to 0.0200" or 0.0005" to 0.0350". Of course, it is understood that other meshes could be used as well (e.g., woven meshes).

By using the crimped connection 52 to electrically connect between the wire 44 to the conductive mesh 26 instead of a soldered connection, more consistent results can be achieved, which can be beneficial in steering wheel embodiments. For example, if the crimped connection 52 is situated beneath the aesthetic cover 24, the crimped connection 52 could be arranged to maintain a small profile that would be less detectable by the hands 20 of driver 18 than may be the case with a soldered connection that uses a lump of solder.

Although example embodiments have been disclosed, a worker of ordinary skill in this art would recognize that certain modifications would come within the scope of the claims. For that reason, the following claims should be studied to determine their true scope and content.

What is claimed is:

1. An assembly, comprising:
an electrically conductive member;
an electrically conductive mesh comprising:
a second area that extends along a second longitudinal axis; and
a first area that is twisted and extends from the second area along a first longitudinal axis that is transverse to the second longitudinal axis;
wherein one of the electrically conductive member and the twisted first area is twisted around the other of the electrically conductive member and the twisted first area to form a twisted connection; and
a crimp connector that is crimped onto the twisted connection to form a crimped connection;
wherein the first area of the electrically conductive mesh, including the crimped connection, is folded onto the second area of the electrically conductive mesh; and
wherein the second area is larger than the first area.

2. The assembly of claim 1, wherein the first area of the electrically conductive mesh comprises a rectangular tab.

3. The assembly of claim 1, wherein the electrically conductive member is a wire, and wherein the wire and the twisted first area are twisted around each other to form the twisted connection.

4. The assembly of claim 1, wherein the electrically conductive mesh comprises a plurality of interlocking loops that are electrically conductive, and the loops of each row wrap about legs of the loops in an adjacent row.

5. The assembly of claim 1, wherein the electrically conductive mesh comprises aluminum, copper, or tungsten.

6. The assembly of claim 5, wherein the electrically conductive mesh comprises a nickel-copper alloy.

7. The assembly of claim 1, comprising:
a steering wheel core; and
an aesthetic cover that is wrapped around the steering wheel core;
wherein the second area of the electrically conductive mesh is wrapped around the steering wheel core, and is at least partially situated between the steering wheel core and the aesthetic cover.

8. The assembly of claim 7, comprising:
a capacitive sensor situated between the aesthetic cover and the second area of the electrically conductive mesh; and
a heating element situated between steering wheel core and the second area of the electrically conductive mesh;
wherein the second area of the electrically conductive mesh is configured as an electromagnetic interference (EMI) shield to shield the capacitive sensor from EMI of the heating element.

9. The assembly of claim 1, wherein the first area and the second area are both meshed areas.

10. A method of electrically connecting an electrically conductive member to an electrically conductive mesh, comprising:
twisting a first area of the electrically conductive mesh, which extends along a first longitudinal axis from a second area of the electrically conductive mesh, to form a twisted mesh area, wherein the second area extends along a second longitudinal axis that is transverse to the first longitudinal axis, and wherein the second area is larger than the first area;
twisting one of the electrically conductive member and the twisted mesh area around the other of the electrically conductive member and the twisted mesh area to form a twisted connection;
crimping a crimp connector over the twisted connection to form a crimped connection; and
folding the first area of the electrically conductive mesh, including the crimped connection, onto the second area of the electrically conductive mesh.

11. The method of claim 10, wherein the first area of the electrically conductive mesh comprises a rectangular tab.

12. The method of claim 11, wherein the first area and the second area are both meshed areas.

13. The method of claim 10, wherein the electrically conductive member is a wire, and wherein twisting one of the wire and the twisted mesh area around the other of the wire and the twisted mesh area to form a twisted connection comprises twisting the wire and the twisted mesh area around each other.

14. The method of claim 10, wherein prior to the crimping, the crimp connector has a cylindrical shape.

15. The method of claim 10, wherein the electrically conductive mesh comprises a plurality of interlocking loops that are electrically conductive.

16. The method of claim 10, wherein the electrically conductive mesh comprises aluminum, copper, or tungsten.

17. The method of claim 10, comprising:
wrapping the electrically conductive mesh around a steering wheel core; and
wrapping a capacitive sensor layer around the steering wheel core, such that the electrically conductive mesh is situated between the steering wheel core and the capacitive sensor layer.

18. The method of claim 17, comprising:
wrapping a heating element around the steering wheel core, such that the heating element is situated between the steering wheel core and the electrically conductive mesh, and the electrically conductive mesh acts as an electromagnetic interference (EMI) shield to shield the capacitive sensor layer from EMI of the heating element.

19. A steering wheel assembly, comprising:
a steering wheel core;
an electrically conductive shield layer comprising:
a second area that extends along a second longitudinal axis; and a first area that is twisted and extends from the second area along a first longitudinal axis that is transverse to the second longitudinal axis;

wherein one of the electrically conductive member and the twisted first area is twisted around the other of the electrically conductive member and the twisted first area to form a twisted connection, and the second area is larger than the first area;

a crimp connector that is crimped onto the twisted connection to form a crimped connection, wherein the first area of the shield layer, including the crimped connection, is folded onto the second area of the shield layer;

a sensor layer;

wherein each of the shield layer and sensor layer at least partially surround the steering wheel core;

wherein the shield layer is situated between the steering wheel core and the sensor layer and acts as an electromagnetic interference (EMI) shield for the sensor layer.

20. The steering wheel assembly of claim 19, wherein the electrically conductive shield layer is knitted and includes a plurality of interlocking loops that are electrically conductive.

21. The steering wheel assembly of claim 19, wherein the electrically conductive member is a wire, and wherein the wire and the twisted first area are twisted around each other to form the twisted connection.

* * * * *